United States Patent
Nakajima et al.

(10) Patent No.: US 6,337,158 B1
(45) Date of Patent: Jan. 8, 2002

(54) LITHIUM SECONDARY BATTERY

(75) Inventors: Hiroshi Nakajima, Hirakata; Hiroyuki Fujimoto, Toyonaka; Ryuji Ohshita, Neyagawa; Shin Fujitani, Hirakata; Hiroshi Watanabe, Sumoto; Toshiyuki Nohma; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/464,193

(22) Filed: Dec. 16, 1999

(30) Foreign Application Priority Data

Dec. 18, 1998 (JP) .......................... 10-375978
Oct. 25, 1999 (JP) .......................... 11-301823

(51) Int. Cl.$^7$ ................................. H01M 4/50
(52) U.S. Cl. .................. 429/224; 429/429; 429/231.1; 429/223; 429/221; 429/218.01; 429/220
(58) Field of Search ............... 429/224, 231.1, 429/223, 221, 218.1, 220

(56) References Cited

U.S. PATENT DOCUMENTS 5,820,790 A   10/1998   Amine et al. ............ 252/519.1
5,962,166 A * 10/1999   Ein-Eli et al. ............ 429/224

FOREIGN PATENT DOCUMENTS

JP   9-270259 A   10/1997
JP   11-73962 A   3/1999

OTHER PUBLICATIONS

Qiming Zhong et al., "Synthesis and Electrochemistry of LiNi$_x$Mn$_{2-x}$O$_4$" *J. Electrochem. Soc.*, vol. 144, No. 1, pp. 205–213, Jan. 1997.

* cited by examiner

Primary Examiner—Laura Weiner
(74) Attorney, Agent, or Firm—Kubovcik & Kubocvik

(57) ABSTRACT

A lithium secondary battery of this invention includes a positive electrode using, as an active material, a lithium-containing manganese composite oxide with a spinel structure having a composition, during charge and discharge, represented by a formula, $Li_xMn_{2-y-z}Ni_yM_zO_4$, in which M is at least one element selected from the group consisting of Fe, Co, Ti, V, Mg, Zn, Ga, Nb, Mo and Cu; $0.02 \leq x \leq 1.10$, whereas x changes in accordance with occlusion and discharge of lithium ions during charge and discharge; $0.25 \leq y \leq 0.60$; and $0 < z \leq 0.10$. Thus, the invention provides a high-voltage lithium secondary battery exhibiting good charge-discharge cycle performance.

20 Claims, 1 Drawing Sheet

LITHIUM SECONDARY BATTERY

BACKGROUND OF THE INVENTION

This application claims the priority of Japanese Patent Application No. 10-375978/1998 filed on Dec. 18, 1998 and No. 11-301823/1999 filed on Oct. 25, 1999, which are incorporated herein by reference.

The present invention relates to a lithium secondary battery comprising a positive electrode using, as an active material, a lithium-containing manganese composite oxide having a spinel structure, and the positive electrode used therein. More particularly, it relates to improvement of an active material of a positive electrode for the purpose of providing a high-voltage lithium secondary battery exhibiting good charge-discharge cycle performance.

As positive electrode materials (positive electrode active materials) for lithium secondary batteries, $LiCoO_2$ and $LiNiO_2$ are conventionally well known, but these positive electrode materials are expensive and hence disadvantageous in material cost.

Therefore, lithium-containing manganese oxides such as a lithium-containing manganese oxide having a spinel structure ($LiMn_2O_4$) and an orthorhombic lithium-containing manganese oxide ($LiMnO_2$) have been proposed as the positive electrode active material. Such a lithium-containing manganese oxide is one of promising materials for a positive electrode of a lithium secondary battery because manganese, the raw material, is an abundant resource and hence inexpensive.

However, when the conventional lithium-containing manganese oxide is used, the discharge potential versus lithium ($Li/Li^+$) is as low as 4.2 V or less and hence the discharge capacity is small.

As a positive electrode material having a potential plateau in the vicinity of 4.7 V and a discharge potential of 4.5 V or more versus lithium, a lithium-containing manganese oxide represented by a formula, $Li_{x-y}M_zMn_{2-y-z}O_4$ (wherein $0 \leq x<1$, $0 \leq y<0.33$ and $0<z<1$), has been proposed (in U.S. Pat. No. 5631104 and Japanese Laid-Open Patent Publication No. 9-147867/1997). This lithium-containing manganese oxide is obtained by substituting another transition metal M, such as nickel and chromium, for part of manganese of a lithium-containing manganese oxide having a spinel structure.

This lithium-containing manganese oxide, however, was found to have a problem of poor charge-discharge cycle performance because its crystal structure is partially changed through repeated charge and discharge.

The present invention was devised in view of these conventional problems, and the object is providing a high-voltage lithium secondary battery exhibiting good charge-discharge cycle performance. This object is achieved by utilizing a specific lithium-containing manganese oxide as an active material of a positive electrode as described in detail below.

SUMMARY OF THE INVENTION

In order to achieve the aforementioned object, the lithium secondary battery of this invention (present battery) comprises a positive electrode using, as an active material, a lithium-containing manganese composite oxide with a spinel structure having a composition, during charge and discharge, represented by a formula, $Li_xMn_{2-y-z}Ni_yM_zO_4$, wherein M is at least one element selected from the group consisting of Fe, Co, Ti, V, Mg, Zn, Ga, Nb, Mo and Cu; $0.02 \leq x \leq 1.10$ (whereas x changes in accordance with occlusion and discharge of lithium ions during charge and discharge); $0.25 \leq y \leq 0.60$; and $0<z \leq 0.10$. Specifically, the positive electrode active material of the present battery is a lithium-containing composite oxide in which Ni and a specific element M such as Fe are substituted for part of Mn. Since Ni is thus substituted for part of Mn, the positive electrode active material attains a stable crystal structure even at a high potential of 4.5 V or more. Also, since the specific element M such as Fe is substituted for part of Mn, the ordering energy can be lowered, resulting in reducing strain of the crystal structure caused during repeated charge and discharge. Accordingly, the present battery can exhibit good charge-discharge cycle performance.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawing, wherein.

DETAILED DESCRIPTION OF THE INVENTION

Figure 1:
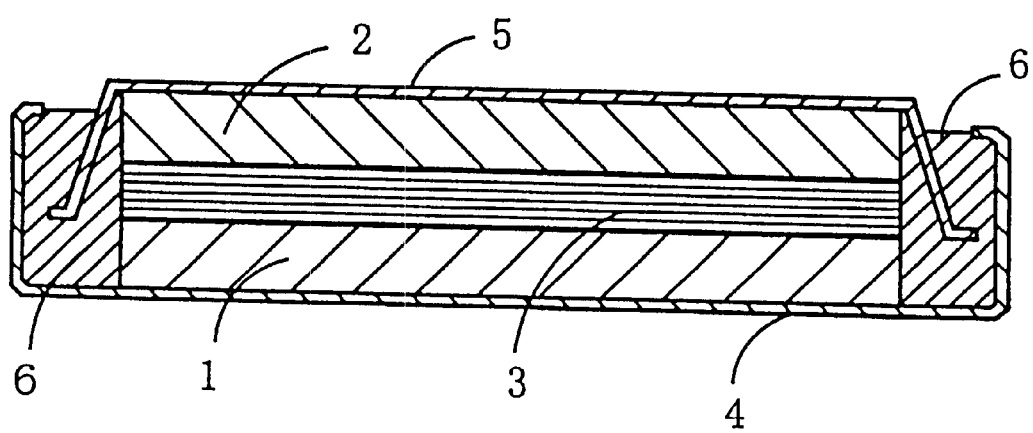
FIG. 1 is a sectional view of a flat lithium secondary battery fabricated in each embodiment of the invention.

In the composition formula of the lithium-containing manganese composite oxide used in the present battery, x should be 0.02 or more because it is difficult to electrochemically draw lithium ions until x becomes smaller than 0.02 without breaking the spinel structure. Furthermore, x should be 1.10 or less because when the battery is discharged until x exceeds 1.10 and charged again at 4 V or more, the crystal structure of the positive electrode active material is so largely changed that the charge-discharge cycle performance is largely degraded. Also, y should be 0.25 or more and 0.60 or less because the charge-discharge cycle performance is largely degraded when y is out of this range. Furthermore, z should be 0.10 or less because the charge-discharge cycle performance is largely degraded when z exceeds 0.10.

In the lithium-containing manganese composite oxide, it is preferred that M is at least one element selected from the group consisting of Fe, Co, Ti and V, that y is 0.30 through 0.50 and that z is 0.03 through 0.08. In these cases, the crystal structure is minimally changed during charge-discharge cycles, resulting in attaining good charge-discharge cycle performance. Also, the lithium-containing manganese composite oxide is preferably in the form of a powder with a median diameter of 1 through 30 μm and more preferably 6 through 20 μmn.

The present invention is characterized by the specific positive electrode active material used for the purpose of providing a high-voltage lithium secondary battery exhibiting good charge-discharge cycle performance. Accordingly, any of conventionally known materials can be used for other battery members such as a negative electrode and an electrolyte.

Examples of the negative electrode material are metallic lithium; lithium alloy such as lithium-aluminum alloy, lithium-lead alloy and lithium-tin alloy; a carbon material such as graphite, coke and an organic baked substance; and a metal oxide having a base potential as compared with the potential of the positive electrode material, such as $SnO_2$, SnO, $TiO_2$ and $Nb_2O_3$.

Examples of a solute for the electrolyte (nonaqueous electrolyte) are $LiClO_4$, $LiCF_3SO_3$, $LiPF_6$, $LiN(CF_3SO_2)_2$, $LiN(C_2F_5SO_2)_2$, $LiBF_4$, $LiSbF_6$ and $LiAsF_6$, and examples of a solvent for the electrolyte are cyclic carbonic esters such as ethylene carbonate, propylene carbonate, vinylene carbonate and butylene carbonate, and a mixed solvent including a cyclic carbonic ester and a solvent with a low boiling point such as dimethyl carbonate, diethyl carbonate, methylethyl carbonate, 1,2-dimethoxyethane, 1,2-diethoxyethane and ethoxymethoxyethane.

Since the positive electrode of the present battery uses the aforementioned specific lithium-containing manganese oxide as the active material, its substantial discharge potential versus lithium is as high as 4.5 V or more, and in addition, its discharge capacity is minimally lowered during repeated charge-discharge cycles. Accordingly, the invention provides a high-voltage lithium secondary battery exhibiting good charge-discharge cycle performance. Herein, the substantial discharge potential versus lithium of 4.5 V or more means that the discharge capacity is 4.5 V or more versus lithium during 50% or more of discharge time in the case where the battery is charged up to 5.0 V with 0.15 mA/cm$^2$ and then discharged down to 3.0 V with 0.15 mA/cm$^2$.

Other features of the invention will become more apparent in the course of the following descriptions of exemplary embodiments which are given for illustration of the invention and not intended to be limiting thereof.

EMBODIMENTS

Experiment 1

Present batteries and comparative batteries were fabricated so as to compare their charge-discharge cycle performance.

Embodiment 1

Preparation of Positive Electrode

Manganese acetate ($Mn(CH_3COO)_2$), nickel nitrate ($Ni(NO_3)_2$) and magnesium acetate ($Mg(CH_3COO)_2$) were mixed in a molar ratio of 1.55:0.40:0.05, the thus obtained mixture was added to a 50 vol % ethyl alcohol aqueous solution and the resultant was stirred. To this solution, 30 vol % aqueous ammonia was added to give a precipitate. The precipitate was mixed with lithium nitrate ($LiNO_3$) in an atomic ratio between the total amount of Mn, Ni and Mg and the amount of Li of 2:1. The resultant mixture was baked in an oxygen atmosphere at 700° C. for 20 hours, then cooled to room temperature and crushed with a jet mill. Thus, a lithium-containing manganese composite oxide (positive electrode active material) having a median diameter of 10 μm and represented by a formula, $LiMn_{1.55}Ni_{0.04}MgO_{0.05}O_4$, was prepared. The median diameter was obtained by laser diffraction (all median diameters mentioned below were also obtained by the same method). It was confirmed through the X-ray powder diffraction method that this lithium-containing manganese composite oxide has a single phase structure corresponding to a spinel structure.

A mixture of the lithium-containing manganese composite oxide, acetylene black serving as a conductive agent and poly(vinylidene fluoride) serving as a binder in a weight ratio of 90:6:4 was kneaded, thereby preparing a positive electrode mixed material. The positive electrode mixed material was pressed at a pressure of 2 ton/cm$^2$, so as to be formed into a disk with a diameter of 20 mm, and the resultant disk was heat-treated under vacuum at 250° C. for 2 hours. Thus, a positive electrode was prepared.

Preparation of Negative Electrode

A rolled plate of metallic lithium was punched into a disk with a diameter of 20 mm, thereby preparing a negative electrode.

Preparation of Electrolyte

In a mixed solvent including ethylene carbonate, dimethyl carbonate and ethylmethyl carbonate in a volume ratio of 1:2:1, $LiPF_6$ was dissolved in a concentration of 1 mol/liter, thereby preparing an electrolyte.

Fabrication of Lithium Secondary Battery

A flat lithium secondary battery (present battery A1) was fabricated by using the positive electrode, the negative electrode and the nonaqueous electrolyte prepared as described above. The capacity ratio between the positive electrode and the negative electrode was set to 1:2. A polypropylene film having lithium ion permeability was used as a separator. In all batteries fabricated in embodiments and comparative examples described below, the capacity ratio between the positive electrode and the negative electrode was also set to 1:2. FIG. 1 is a sectional view of the present battery A1, which comprises a positive electrode 1, a negative electrode 2, a separator 3, a positive electrode can 4, a negative electrode can 5, an insulating packing 6 and the like. The positive electrode 1 and the negative electrode 2 opposing each other with the separator 3 sandwiched therebetween are housed in a battery can formed by the positive electrode can 4 and the negative electrode can 5. The positive electrode 1 is connected with the positive electrode can 4 and the negative electrode 2 is connected with the negative electrode can 5, so that chemical energy generated within the battery can be taken out as electrical energy.

Embodiments 2 Through 7

Six kinds of lithium-containing manganese composite oxides ($LiMn_{1.55}Ni_{0.40}M_{0.05}O_4$, wherein M is Fe, Co, Zn, Ga, Nb or Mo) with a median diameter of 10 μm were prepared in the same manner as in Embodiment 1 except that magnesium acetate was replaced with iron nitrate ($Fe(NO_3)_3$), cobalt acetate ($Co(CH_3COO)_2$), zinc nitrate ($Zn(NO_3)_2$), gallium nitrate ($Ga(NO_3)_3$), niobium chloride ($NbCl_5$) or molybdenum chloride ($MoCl_5$) in the same molar ratio. All of these lithium-containing manganese composite oxides were confirmed through the X-ray powder diffraction method to have a single phase structure corresponding to a spinel structure.

These lithium-containing manganese composite oxides were respectively used as positive electrode active materials for fabricating present batteries A2 through A7, which are different from the present battery A1 in the positive electrode active material alone.

Embodiments 8 Through 10

Three kinds of lithium-containing manganese composite oxides ($LiMn_{1.55}Ni_{0.40}M_{0.05}O_4$, wherein M is Ti, V or Cu) with a median diameter of 10 μm were prepared in the same manner as in Embodiment 1 except that magnesium acetate was replaced with titanium chloride ($TiCl_4$), vanadium chloride ($VCl_3$) or copper nitrate ($Cu(NO_3)_2$) in the same molar ratio. All of these lithium-containing manganese composite oxides were confirmed through the X-ray powder diffraction method to have a single phase structure corresponding to a spinel structure.

These lithium-containing manganese composite oxides were respectively used as positive electrode active materials for fabricating present batteries A8 through A10, which are different from the present battery A1 in the positive electrode active material alone.

Comparative Example 1

Manganese carbonate ($MnCO_3$), nickel nitrate and lithium carbonate ($Li_2CO_3$) were mixed in a molar ratio of 1.60:0.40:0.50, and the thus obtained mixture was baked in an oxygen atmosphere at 700° C. for 20 hours, then cooled to room temperature and crushed with a jet mill. Thus, a lithium-containing manganese composite oxide (positive electrode active material) having a median diameter of 10 $\mu$m and represented by a formula, $LiMn_{1.60}Ni_{0.40}O_4$, was prepared. It was confirmed through the X-ray powder diffraction method that this lithium-containing manganese composite oxide has a single phase structure corresponding to a spinel structure.

This lithium-containing manganese composite oxide was used as a positive electrode active material for fabricating a comparative battery X1, which is different from the present battery A1 in the positive electrode active material alone.

Comparative Example 2

Electrolytic manganese dioxide, nickel nitrate and lithium hydroxide (LiOH) were mixed in a molar ratio of 1.60:0.40:1.00, and the thus obtained mixture was baked in air at 750° C. for 16 hours, then cooled to room temperature, and crushed with a jet mill. Thus, a lithium-containing manganese composite oxide (positive electrode active material) having a median diameter of 10 $\mu$m and represented by a formula, $LiMn_{1.60}Ni_{0.40}O_4$, was prepared. It was confirmed through the X-ray powder diffraction method that this lithium-containing manganese composite oxide has a single phase structure corresponding to a spinel structure.

This lithium-containing manganese composite oxide was used as a positive electrode active material for fabricating a comparative battery X1, which is different from the present battery A1 in the positive electrode active material alone.

Comparative Example 3

Manganese acetate, iron nitrate and aluminum nitrate were mixed in a molar ratio of 1.55:0.40:0.05, the thus obtained mixture was added to a 50 vol % ethyl alcohol aqueous solution and the resultant was stirred. To this solution, 30 vol % aqueous ammonia was added to give a precipitate. The precipitate was mixed with lithium nitrate in an atomic ratio between the total amount of Mn, Fe and Al and the amount of Li of 2:1. The mixture was baked in an oxygen atmosphere at 700° C. for 20 hours, then cooled to room temperature, and crushed with a jet mill. Thus, a lithium-containing manganese composite oxide (positive electrode active material) having a median diameter of 10 $\mu$m and represented by a formula, $LiMn_{1.55}Fe_{0.40}Al_{0.05}O_4$, was prepared. It was confirmed through the X-ray powder diffraction method that this lithium-containing manganese composite oxide has a single phase structure corresponding to a spinel structure.

The lithium-containing manganese composite oxide was used as a positive electrode active material for fabricating a comparative battery X3, which is different from the present battery A1 in the positive electrode active material alone.

Charge-discharge Cycle Test

With respect to each of the batteries fabricated as described above, 20 charge-discharge cycles were run, in each cycle of which the battery was charged to 5.0 V with 0.15 mA/cm$^2$ and discharged to 3.0 V with 0.15 mA/cm$^2$, thereby obtaining a capacity retention ratio (%) at the 20th cycle defined by the following formula and a discharge voltage (V) at the 20th cycle. The discharge voltage was obtained by plotting a discharge curve in a graph with the ordinate indicating the voltage and the abscissa indicating x (corresponding to x in $Li_xMn_{1.55}Ni_{0.40}M_{0.05}O_4$ or $Li_xMn_{1.60}Ni_{0.40}O_4$) and reading a value on the ordinate corresponding to a point where x was 0.5 on the discharge curve. The capacity retention ratio (%) and the discharge voltage (V) at the 20th cycle of each battery are shown in Table 1.

Capacity retention ratio (%)=(Discharge capacity at 20th cycle/ Discharge capacity at 1st cycle)×100

TABLE 1

| Battery | Composition of positive electrode active material | Capacity retention ratio (%) | Discharge voltage (V) |
| --- | --- | --- | --- |
| A1 | $LiMn_{1.55}Ni_{0.40}Mg_{0.05}O_4$ | 96.4 | 4.62 |
| A2 | $LiMn_{1.55}Ni_{0.40}Fe_{0.05}O_4$ | 97.5 | 4.62 |
| A3 | $LiMn_{1.55}Ni_{0.40}Co_{0.05}O_4$ | 97.6 | 4.62 |
| A4 | $LiMn_{1.55}Ni_{0.40}Zn_{0.05}O_4$ | 96.4 | 4.62 |
| A5 | $LiMn_{1.55}Ni_{0.40}Ga_{0.05}O_4$ | 96.5 | 4.62 |
| A6 | $LiMn_{1.55}Ni_{0.40}Nb_{0.05}O_4$ | 96.4 | 4.62 |
| A7 | $LiMn_{1.55}Ni_{0.40}Mo_{0.05}O_4$ | 96.4 | 4.62 |
| A8 | $LiMn_{1.55}Ni_{0.40}Ti_{0.05}O_4$ | 97.8 | 4.60 |
| A9 | $LiMn_{1.55}Ni_{0.40}V_{0.05}O_4$ | 97.7 | 4.60 |
| A10 | $LiMn_{1.55}Ni_{0.40}Cu_{0.05}O_4$ | 96.4 | 4.62 |
| X1 | $LiMn_{1.60}Ni_{0.40}O_4$ | 91.4 | 4.60 |
| X2 | $LiMn_{1.60}Ni_{0.40}O_4$ | 91.4 | 4.60 |
| X3 | $LiMn_{1.55}Fe_{0.40}Al_{0.05}O_4$ | 88.7 | 4.06 |

As in shown in Table 1, the capacity retention ration is larger in the present batteries A1 through A10 than in the comparative batteries X1 and X2. The present batteries A1 through A10 have such large capacity retention ratios probably because the ordering energy of the positive electrode active material is lowered by substituting Ni in a predetermined amount and the specific element M for part of Mn, resulting in reducing strain of the crystal structure caused in repeated charge and discharge. Also, the capacity retention ratio is larger in the present batteries A1 through A10 than in the comparative battery X3. The comparative battery X3 has a small capacity retention ratio probably because its crystal structure becomes so unstable at a potential exceeding 4.5 V due to absence of Ni in the positive electrode active material that the crystal structure is changed. This reveals that Ni is indispensable as an element for substituting for part of Mn. Furthermore, among the present batteries, the capacity retention ratio is particularly large in the present batteries A2, A3, A8 and A9. This means that the element M of the lithium-containing manganese composite oxide is preferably at least one element selected from the group consisting of Fe, Co, Ti and V.

Experiment 2

The relationship between y (in the formula, $Li_xMn_{2-y-z}Ni_yM_zO_4$) and the capacity retention ratio and the discharge voltage was examined.

Manganese acetate, nickel nitrate and cobalt acetate were mixed in a molar ratio of 1.75:0.20:0.05, 1.70:0.25:0.05, 1.65:0.30:0.05, 1.45:0.50:0.05, 1.35:0.60:0.05 or 1.30:0.65:0.05. Each of the resultant mixtures was added to a 50 vol % ethyl alcohol aqueous solution and the resultant was stirred. To this solution, 30 vol % aqueous ammonia was added to give a precipitate. The precipitate was mixed with lithium nitrate in an atomic ratio between the total amount of Mn, Ni and Co and the amount of Li of 2:1, and the obtained mixture was baked in an oxygen atmosphere at 700° C. for 20 hours, then cooled to room temperature and crushed with a jet mill. Thus, lithium-containing manganese composite oxides (positive electrode active materials) having a median diameter of 10 μm and respectively represented by formulas, $LiMn_{1.75}Ni_{0.20}Co_{0.05}O_4$, $LiMn_{1.70}Ni_{0.25}Co_{0.05}O_4$, $LiMn_{1.65}Ni_{0.30}Co_{0.05}O_4$, $LiMn_{1.45}Ni_{0.50}Co_{0.05}O_4$, $LiMn_{1.35}Ni_{0.60}Co_{0.05}O_4$ and $LiMn_{1.30}Ni_{0.65}Co_{0.05}O_4$, were prepared. It was confirmed through the X-ray powder diffraction method that all of these lithium-containing manganese composite oxides have a single phase structure corresponding to a spinel structure.

The lithium-containing manganese composite oxides prepared as described above were respectively used as positive electrode active materials for fabricating present batteries B1 through B4 and comparative batteries Y1 and Y2, which are different from the present battery A1 in the positive electrode active material alone.

Furthermore, manganese acetate, nickel nitrate and titanium chloride were mixed in a molar ratio of 1.75:0.20:0.05, 1.70:0.25:0.05, 1.65:0.30:0.05, 1.45:0.50:0.05, 1.35:0.60:0.05 or 1.30:0.65:0.05. Each of the resultant mixtures was added to a 50 vol % ethyl alcohol aqueous solution and the resultant was stirred. To this solution, 30 vol % aqueous ammonia was added to give a precipitate. The precipitate was mixed with lithium nitrate in an atomic ratio between the total amount of Mn, Ni and Ti and the amount of Li of 2:1. The resultant mixture was baked in an oxygen atmosphere at 700° C., for 20 hours, then cooled to room temperature and crushed with a jet mill. Thus, lithium-containing manganese composite oxides (positive electrode active materials) having a median diameter of 10 μm and respectively represented by formulas, $LiMn_{1.75}Ni_{0.20}Ti_{0.05}O_4$, $LiMn_{1.70}Ni_{0.25}Ti_{0.05}O_4$, $LiMn_{1.65}Ni_{0.30}Ti_{0.05}O_4$, $LiMn_{1.45}Ni_{0.50}Ti_{0.05}O_4$, $LiMn_{1.35}Ni_{0.60}Ti_{0.05}O_4$ and $LiMn_{1.30}Ni_{0.65}Ti_{0.05}O_4$, were prepared. It was confirmed through the X-ray powder diffraction method that all of these lithium-containing manganese composite oxides have a single phase structure corresponding to a spinel structure.

The lithium-containing manganese composite oxides prepared as described above were respectively used as positive electrode active materials for fabricating present batteries B5 through B8 and comparative batteries Y3 and Y4, which are different from the present battery A1 in the positive electrode active material alone.

Each of the batteries fabricated as described above was subjected to the charge-discharge cycle test under the same conditions as in Experiment 1, thereby obtaining the capacity retention ratio and the discharge voltage. The results are shown in Tables 2 and 3. The capacity retention ratios and the discharge voltage of the present batteries A3 and A8 shown in Table 1 are also listed in Tables 2 and 3, respectively.

TABLE 2

| Battery | Composition of positive electrode active material | y | Capacity retention ratio (%) | Discharge voltage (V) |
|---|---|---|---|---|
| Y1 | $LiMn_{1.75}Ni_{0.20}Co_{0.05}O_4$ | 0.20 | 91.1 | 4.28 |
| B1 | $LiMn_{1.70}Ni_{0.25}Co_{0.05}O_4$ | 0.25 | 96.5 | 4.50 |
| B2 | $LiMn_{1.65}Ni_{0.30}Co_{0.05}O_4$ | 0.30 | 97.5 | 4.54 |
| A3 | $LiMn_{1.55}Ni_{0.40}Co_{0.05}O_4$ | 0.40 | 97.6 | 4.62 |
| B3 | $LiMn_{1.45}Ni_{0.50}Co_{0.05}O_4$ | 0.50 | 97.4 | 4.62 |
| B4 | $LiMn_{1.35}Ni_{0.60}Co_{0.05}O_4$ | 0.60 | 96.4 | 4.63 |
| Y2 | $LiMn_{1.30}Ni_{0.65}Co_{0.05}O_4$ | 0.65 | 91.0 | 4.63 |

TABLE 3

| Battery | Composition of positive electrode active material | y | Capacity retention ratio (%) | Discharge voltage (V) |
|---|---|---|---|---|
| Y3 | $LiMn_{1.75}Ni_{0.20}Ti_{0.05}O_4$ | 0.20 | 91.1 | 4.28 |
| B5 | $LiMn_{1.70}Ni_{0.25}Ti_{0.05}O_4$ | 0.25 | 96.5 | 4.50 |
| B6 | $LiMn_{1.65}Ni_{0.30}Ti_{0.05}O_4$ | 0.30 | 97.6 | 4.54 |
| A8 | $LiMn_{1.55}Ni_{0.40}Ti_{0.05}O_4$ | 0.40 | 97.8 | 4.60 |
| B7 | $LiMn_{1.45}Ni_{0.50}Ti_{0.05}O_4$ | 0.50 | 97.7 | 4.62 |
| B8 | $LiMn_{1.35}Ni_{0.60}Ti_{0.05}O_4$ | 0.60 | 96.4 | 4.63 |
| Y4 | $LiMn_{1.30}Ni_{0.65}Ti_{0.05}O_4$ | 0.65 | 91.0 | 4.63 |

As is shown in Table 2, in the present batteries A3 and B1 through B4 using the positive electrode active materials of the lithium-containing manganese composite oxides in which y is 0.25 through 0.60, the capacity retention ratio is larger than in the comparative batteries Y1 and Y2 using the positive electrode active materials of the lithium-containing manganese composite oxides in which y is smaller than 0.25 or larger than 0.60.

Also, as is shown in Table 3, in the present batteries A8 and B5 through B8 using the positive electrode active materials of the lithium-containing manganese composite oxides in which y is 0.25 through 0.60, the capacity retention ratio is larger than in the comparative batteries Y3 and Y4 using the positive electrode active materials of the lithium-containing manganese composite oxides in which y is smaller than 0.25 or larger than 0.60.

The comparative batteries Y1 and Y3 have small capacity retention ratios probably because the proportion of unstable Mn with a valence of 3 to stable Mn with a valence of 4 is so large that part of Mn is eluted into the electrolyte. The comparative batteries Y2 and Y4 have small capacity retention ratios probably because the proportion of unstable Ni with a valence of 3 to stable Ni with a valence of 2 is so large that the crystal structure of the lithium-containing manganese composite oxide becomes unstable.

Among the present batteries A3, A8 and B1 through B8, the capacity retention ratio is particularly large in the present batteries A3, B2, B3, A8, B6 and B7. This means that y is preferably 0.30 through 0.50 in the lithium-containing manganese composite oxide.

Experiment 3

The relationship between z (in the formula, $Li_xMn_{2-y-z}Ni_yM_zO_4$) and the capacity retention ratio and the discharge voltage was examined.

Manganese acetate, nickel nitrate and cobalt acetate were mixed in a molar ratio of 1.59:0.40:0.01, 1.57:0.40:0.03, 1.52:0.40:0.08, 1.50:0.40:0.10 or 1.47:0.40:0.13. Each of the resultant mixtures was added to a 50 vol % ethyl alcohol aqueous solution and the resultant was stirred. To this solution, 30 vol % aqueous ammonia was added to give a precipitate. The precipitate was mixed with lithium nitrate in an atomic ratio between the total amount of Mn, Ni and Co and the amount of Li of 2:1, and the obtained mixture was baked in an oxygen atmosphere at 700° C. for 20 hours, then cooled to room temperature and crushed with a jet mill. Thus, lithium-containing manganese composite oxides (positive electrode active materials) having a median diameter of 10 μm and respectively represented by formulas, $LiMn_{1.59}Ni_{0.40}Co_{0.01}O_4$, $LiMn_{1.57}Ni_{0.40}Co_{0.03}O_4$, $LiMn_{1.52}Ni_{0.40}Co_{0.08}O_4$, $LiMn_{1.50}Ni_{0.40}Co_{0.10}O_4$ and $LiMn_{1.47}Ni_{0.40}Co_{0.13}O_4$, were prepared. It was confirmed through the X-ray powder diffraction method that all of these lithium-containing manganese composite oxides have a single phase structure corresponding to a spinel structure.

The lithium-containing manganese composite oxides prepared as described above were respectively used as positive electrode active materials for fabricating present batteries C1 through C4 and a comparative battery Y5, which are different from the present battery A1 in the positive electrode active material alone.

Furthermore, manganese acetate, nickel nitrate and titanium chloride were mixed in a molar ratio of 1.59:0.40:0.01, 1.57:0.40:0.03, 1.52:0.40:0.08, 1.50:0.40:0.10 or 1.47:0.40:0.13. Each of the resultant mixtures was added to a 50 vol % ethyl alcohol aqueous solution and the resultant was stirred. To this solution, 30 vol % aqueous ammonia was added to give a precipitate. The precipitate was mixed with lithium nitrate in an atomic ratio between the total amount of Mn, Ni and Ti and the amount of Li of 2:1. The resultant mixture was baked in an oxygen atmosphere at 700° C. for 20 hours, then cooled to room temperature and crushed with a jet mill. Thus, lithium-containing manganese composite oxides (positive electrode active materials) having a median diameter of 10 μm and respectively represented by formulas, $LiMn_{1.59}Ni_{0.40}Ti_{0.01}O_4$, $LiMn_{1.57}Ni_{0.40}Ti_{0.03}O_4$, $LiMn_{1.52}Ni_{0.40}Ti_{0.08}O_4$, $LiMn_{1.50}Ni_{0.40}Ti_{0.10}O_4$ and $LiMn_{1.47}Ni_{0.40}Ti_{0.13}O_4$, were prepared. It was confirmed through the X-ray powder diffraction method that all of these lithium-containing manganese composite oxides have a single phase structure corresponding to a spinel structure.

The lithium-containing manganese composite oxides prepared as described above were respectively used as positive electrode active materials for fabricating present batteries C5 through C8 and a comparative battery Y6, which are different from the present battery A1 in the positive electrode active material alone.

Each of the batteries fabricated as described above was subjected to the charge-discharge cycle test under the same conditions as in Experiment 1, thereby obtaining the capacity retention ratio and the discharge voltage. The results are shown in Tables 4 and 5. The capacity retention ratios and the discharge voltage of the present battery A3 and the comparative battery X1 shown in Table 1 are also listed in Table 4, and the capacity retention ratios and the discharge voltage of the present battery A8 and the comparative battery X1 shown in Table 1 are also listed in Table 5.

TABLE 4

| Battery | Composition of positive electrode active material | z | Capacity retention ratio (%) | Discharge voltage (V) |
|---|---|---|---|---|
| X1 | $LiMn_{1.60}Ni_{0.40}O_4$ | — | 91.4 | 4.60 |
| C1 | $LiMn_{1.59}Ni_{0.40}Co_{0.01}O_4$ | 0.01 | 96.3 | 4.62 |
| C2 | $LiMn_{1.57}Ni_{0.40}Co_{0.03}O_4$ | 0.03 | 97.5 | 4.62 |
| A3 | $LiMn_{1.55}Ni_{0.40}Co_{0.05}O_4$ | 0.05 | 97.6 | 4.62 |
| C3 | $LiMn_{1.52}Ni_{0.40}Co_{0.08}O_4$ | 0.08 | 97.5 | 4.62 |
| C4 | $LiMn_{1.50}Ni_{0.40}Co_{0.10}O_4$ | 0.10 | 96.4 | 4.62 |
| Y5 | $LiMn_{1.47}Ni_{0.40}Co_{0.13}O_4$ | 0.13 | 91.3 | 4.62 |

TABLE 5

| Battery | Composition of positive electrode active material | z | Capacity retention ratio (%) | Discharge voltage (V) |
|---|---|---|---|---|
| X1 | $LiMn_{1.60}Ni_{0.40}O_4$ | — | 91.4 | 4.60 |
| C5 | $LiMn_{1.59}Ni_{0.40}Ti_{0.01}O_4$ | 0.01 | 96.6 | 4.60 |
| C6 | $LiMn_{1.57}Ni_{0.40}Ti_{0.03}O_4$ | 0.03 | 97.6 | 4.60 |
| A8 | $LiMn_{1.55}Ni_{0.40}Ti_{0.05}O_4$ | 0.05 | 97.8 | 4.60 |
| C7 | $LiMn_{1.52}Ni_{0.40}Ti_{0.08}O_4$ | 0.08 | 97.5 | 4.60 |
| C8 | $LiMn_{1.50}Ni_{0.40}Ti_{0.10}O_4$ | 0.10 | 96.6 | 4.60 |
| Y6 | $LiMn_{1.47}Ni_{0.40}Ti_{0.13}O_4$ | 0.13 | 91.3 | 4.60 |

As is shown in Table 4, in the present batteries A3 and C1 through C4 using the positive electrode active materials of the lithium-containing manganese composite oxides in which z is 0.01 through 0.10, the capacity retention ratio is larger than in the comparative batteries X1 and Y5 using the positive electrode active materials of the lithium-containing manganese composite oxides in which z is 0 or larger than 0.10.

Also, as is shown in Table 5, in the present batteries A8 and C5 through C8 using the positive electrode active materials of the lithium-containing manganese composite oxides in which z is 0.01 through 0.10, the capacity retention ratio is larger than in the comparative batteries X1 and Y6 using the positive electrode active materials of the lithium-containing manganese composite oxides in which z is 0 or larger than 0.10.

Among the present batteries A3, A8 and C1 through C8, the capacity retention ratio is particularly large in the present batteries A3, C2, C3, A8, C6 and C7. This means that z is preferably 0.03 through 0.08 in the lithium-containing manganese composite oxide Experiment 4

The relationship between the median diameter of the positive electrode active material and the capacity retention ratio and the discharge voltage was examined.

Manganese acetate, nickel nitrate and cobalt acetate were mixed in a molar ratio of 1.55:0.40:0.05, the obtained mixture was added to a 50 vol % ethyl alcohol aqueous solution, and the resultant was stirred. To this solution, 30 vol % aqueous ammonia was added to give a precipitate. The precipitate was mixed with lithium nitrate in an atomic ratio between the total amount of Mn, Ni and Co and the amount of Li of 2:1. The resultant mixture was baked in an oxygen atmosphere at 700° C. for 20 hours, then cooled to room temperature and crushed with a jet mill with crushing time variously changed. Thus, six kinds of lithium-containing manganese composite oxides (positive electrode active materials) represented by a formula, $LiMn_{1.55}Ni_{0.40}Co_{0.05}O_4$, and respectively having median diameters of 0.5 μm, 1 μm, 6 μm, 20 μm, 30 μm and 35 μm were prepared.

These lithium-containing manganese composite oxides were respectively used as positive electrode active materials for fabricating present batteries D1 through D6, which are different from the present battery A1 in the positive electrode active material alone.

Furthermore, manganese acetate, nickel nitrate and titanium chloride were mixed in a molar ratio of 1.55:0.40:0.05, the obtained mixture was added to a 50 vol % ethyl alcohol aqueous solution, and the resultant was stirred. To this solution, 30 vol % aqueous ammonia was added to give a precipitate. The precipitate was mixed with lithium nitrate in an atomic ratio between the total amount of Mn, Ni and Co and the amount of Li of 2:1. The resultant mixture was baked in an oxygen atmosphere at 700° C. for 20 hours, then cooled to room temperature and crushed with a jet mill with crushing time variously changed. Thus, six kinds of lithium-containing manganese composite oxides (positive electrode active materials) represented by a formula, $LiMn_{1.55}Ni_{0.40}Ti_{0.05}O_4$, and respectively having median diameters of 0.5 μm, 1 μm, 6 μm, 20 μm, 30 μm and 35 μm were prepared.

These lithium-containing manganese composite oxides were respectively used as the positive electrode active materials for fabricating present batteries D7 through D12, which are different from the present battery A1 in the positive electrode active material alone.

Each of the batteries fabricated as described above was subjected to the charge-discharge cycle test under the same conditions as in Experiment 1, thereby obtaining the capacity retention ratio and the discharge voltage. The results are shown in Tables 6 and 7. The capacity retention ratios and the discharge voltage of the present batteries A3 and A8 shown in Table 1 are also listed in Tables 6 and 7, respectively.

TABLE 6

| Battery | Composition of positive electrode active material | Median diameter (μm) | Capacity retention ratio (%) | Discharge voltage (V) |
|---|---|---|---|---|
| D1 | $LiMn_{1.55}Ni_{0.40}Co_{0.05}O_4$ | 0.5 | 95.4 | 4.62 |
| D2 | $LiMn_{1.55}Ni_{0.40}Co_{0.05}O_4$ | 1 | 97.0 | 4.62 |
| D3 | $LiMn_{1.55}Ni_{0.40}Co_{0.05}O_4$ | 6 | 97.6 | 4.62 |
| A3 | $LiMn_{1.55}Ni_{0.40}Co_{0.05}O_4$ | 10 | 97.6 | 4.62 |
| D4 | $LiMn_{1.55}Ni_{0.40}Co_{0.05}O_4$ | 20 | 97.5 | 4.62 |
| D5 | $LiMn_{1.55}Ni_{0.40}Co_{0.05}O_4$ | 30 | 97.1 | 4.62 |
| D6 | $LiMn_{1.55}Ni_{0.40}Co_{0.05}O_4$ | 35 | 95.5 | 4.62 |

TABLE 7

| Battery | Composition of positive electrode active material | Median diameter (μm) | Capacity retention ratio (%) | Discharge voltage (V) |
|---|---|---|---|---|
| D7 | $LiMn_{1.55}Ni_{0.40}Ti_{0.05}O_4$ | 0.5 | 96.1 | 4.60 |
| D8 | $LiMn_{1.55}Ni_{0.40}Ti_{0.05}O_4$ | 1 | 97.0 | 4.60 |
| D9 | $LiMn_{1.55}Ni_{0.40}Ti_{0.05}O_4$ | 6 | 97.7 | 4.60 |
| A8 | $LiMn_{1.55}Ni_{0.40}Ti_{0.05}O_4$ | 10 | 97.8 | 4.60 |
| D10 | $LiMn_{1.55}Ni_{0.40}Ti_{0.05}O_4$ | 20 | 97.7 | 4.60 |
| D11 | $LiMn_{1.55}Ni_{0.40}Ti_{0.05}O_4$ | 30 | 97.1 | 4.60 |
| D12 | $LiMn_{1.55}Ni_{0.40}Ti_{0.05}O_4$ | 35 | 96.0 | 4.60 |

As is shown in Table 6, in the present batteries A3 and D2 through D5 using the positive electrode active materials of the lithium-containing manganese composite oxides with a median diameter of 1 through 30 μm, the capacity retention ratio is larger than in the present batteries D1 and D6 using the positive electrode active materials of the lithium-containing manganese composite oxides with a median diameter out of this range.

Also, as is shown in Table 7, in the present batteries A8 and D8 through D11 using the positive electrode active materials of the lithium-containing manganese composite oxides with a median diameter of 1 through 30 μm, the capacity retention ratio is larger than in the present batteries D7 and D12 using the positive electrode active materials of the lithium-containing manganese composite oxides with a median diameter out of this range.

It is understood from this result that the lithium-containing manganese composite oxide preferably has a median diameter of 1 through 30 μm. The batteries D1 and D7 have small capacity retention ratios probably because the particle size of the positive electrode active material is so small that part of the active material is eluted into the electrolyte. The batteries D6 and D12 have small capacity retention ratios probably because the specific surface area of the positive electrode active material is so small that the charge-discharge reactivity is lowered. Among the batteries A3, A8 and D1 through D12, the capacity retention ratio is particularly large in the batteries A3, D3, D4, A8, D9 and D10. This means that the lithium-containing manganese composite oxide more preferably has a median diameter of 6 through 20 μm.

Although flat lithium secondary batteries were described in the aforementioned embodiments, the present invention is not limited in the shape of batteries but is applicable to lithium secondary batteries in a variety of shapes including a cylindrical shape.

Obviously, numerous modifications and variations of the present invention are possible in light of the above teachings. It is therefore to be understood that within the scope of the appended claims the invention may be practiced otherwise than as specifically described herein.

What is claimed is:

1. A lithium secondary battery comprising a positive electrode using, as an active material, a lithium-containing manganese composite oxide having a spinel structure, the lithium-containing manganese composite oxide having a composition, during charge and discharge, represented by a formula, $Li_xMn_{2-y-z}Ni_yM_zO_4$, in which M is at least one element selected from the group consisting of Fe, Co, Ti, V, Mg, Zn, Ga, Nb and Mo; $0.02 \leq x \leq 1.10$, whereas x changes in accordance with occlusion and discharge of lithium ions during charge and discharge; $0.25 \leq y \leq 0.60$; and $0 < z \leq 0.10$.

2. The lithium secondary battery according to claim 1, wherein M is at least one element selected from the group consisting of Fe, Co, Ti and V.

3. The lithium secondary battery according to claim 1, wherein $0.30 \leq y \leq 0.50$.

4. The lithium secondary battery according to claim 1, wherein M is at least one element selected from the group consisting of Fe, Co, Ti and V, and $0.30 \leq y \leq 0.50$.

5. The lithium secondary battery according to claim 1, wherein $0.03 \leq z \leq 0.08$.

6. The lithium secondary battery according to claim 1, wherein M is at least one element selected from the group consisting of Fe, Co, Ti and V, and $0.03 \leq z \leq 0.08$.

7. The lithium secondary battery according to claim 1, wherein $0.30 \leq y \leq 0.50$ and $0.03 \leq z \leq 0.08$.

8. The lithium secondary battery according to claim 1, wherein M is at least one element selected from the group consisting of Fe, Co, Ti and V, $0.30 \leq y \leq 0.50$ and $0.03 \leq z \leq 0.08$.

9. The lithium secondary battery according to any of claims 1 through 8, wherein the lithium-containing manganese composite oxide has a median diameter of 1 through 30 μm.

10. The lithium secondary battery according to any of claims 1 through 8, wherein the lithium-containing manganese composite oxide has a median diameter of 6 through 20 μm.

11. A positive electrode for a lithium secondary battery comprising, as an active material, a lithium-containing manganese composite oxide having a spinl structure, the lithium-containing manganese composite oxide having a composition, during charge and discharge, represented by a formula, $Li_xMn_{2-y-z}Ni_yM_zO_4$, in which M is at least one element selected form the group consisting of Fe, Co, Ti, V, Mg, Zn, Ga, Nb and Mo; $0.02 \leq x \leq 1.10$, whereas x changes in accordance with occlusion and discharge of lithium ions during charge and discharge; $0.25 \leq y \leq 0.60$; and $0 < z \leq 0.10$.

12. The positive electrode according to claim 11, wherein M is at least one element selected from the group consisting of Fe, Co, Ti and V.

13. The positive electrode according to claim 11, wherein $0.30 \leq y \leq 0.50$.

14. The positive electrode according to claim 11, wherein M is at least one element selected from the group consisting of Fe, Co, Ti and V, and $0.30 \leq y \leq 0.50$.

15. The positive electrode according to claim 11, wherein $0.03 \leq z \leq 0.08$.

16. The positive electrode according to claim 11, wherein M is at least one element selected from the group consisting of Fe, Co, Ti and V, and $0.03 \leq z \leq 0.08$.

17. The positive electrode according to claim 11, wherein $0.30 \leq y \leq 0.50$ and $0.03 \leq z \leq 0.08$.

18. The positive electrode according to claim 11, wherein M is at least one element selected from the group consisting of Fe, Co, Ti and V, $0.30 \leq y \leq 0.50$ and $0.03 \leq z \leq 0.08$.

19. The positive electrode according to any of claims 11 through 18, wherein the lithium-containing manganese composite oxide has a median diameter of 1 through 30 $\mu$m.

20. The positive electrode according to any of claims 11 through 18, wherein the lithium-containing manganese composite oxide has a median diameter of 6 through 20 $\mu$m.

* * * * *